United States Patent
Kim

(10) Patent No.: US 9,592,734 B2
(45) Date of Patent: Mar. 14, 2017

(54) CLUSTER INFORMATION OUTPUT APPARATUS FOR VEHICLE AND CONTROL METHOD THEREOF

(71) Applicant: HYUNDAI MOBIS CO., LTD., Seoul (KR)

(72) Inventor: Seung Jae Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 14/701,403

(22) Filed: Apr. 30, 2015

(65) Prior Publication Data

US 2016/0101695 A1 Apr. 14, 2016

(30) Foreign Application Priority Data

Oct. 10, 2014 (KR) .................. 10-2014-0136672

(51) Int. Cl.
  *B60K 35/00* (2006.01)
  *B60K 37/02* (2006.01)
  *G07C 5/08* (2006.01)

(52) U.S. Cl.
  CPC ............. *B60K 35/00* (2013.01); *G07C 5/08* (2013.01); *G07C 5/0816* (2013.01); *B60K 2350/1068* (2013.01); *B60K 2350/352* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2003/0222878 A1* | 12/2003 | Lin | ........................ | G09G 5/395 345/530 |
| 2004/0189546 A1* | 9/2004 | Sumiyoshi | ............ | B60K 37/02 345/8 |
| 2007/0188023 A1* | 8/2007 | Kraus | .................... | B60K 35/00 307/10.1 |
| 2014/0168278 A1* | 6/2014 | Shi | ........................ | G02B 26/02 345/690 |
| 2015/0205616 A1* | 7/2015 | Thai | ........................ | G06F 9/463 345/542 |

FOREIGN PATENT DOCUMENTS

JP  2005-221664 A  8/2005
KR  10-2012-0102463 A  9/2012

OTHER PUBLICATIONS

Korean Office Action dated Sep. 1, 2015 of corresponding Korean Patent Application No. 10-2014-0136672—6 pages.

* cited by examiner

*Primary Examiner* — Yonel Beaulieu
(74) *Attorney, Agent, or Firm* — Knobbe Martens Olson & Bear LLP

(57) ABSTRACT

A cluster information output apparatus for a vehicle may include: a plurality of peripheral control devices having a function of displaying cluster information; a storage unit configured to store the cluster information and priorities for the plurality of peripheral control devices; and a control unit configured to determine operation states for the plurality of peripheral control devices when an error occurs in an operation state sensed from a cluster, and output the cluster information.

7 Claims, 4 Drawing Sheets

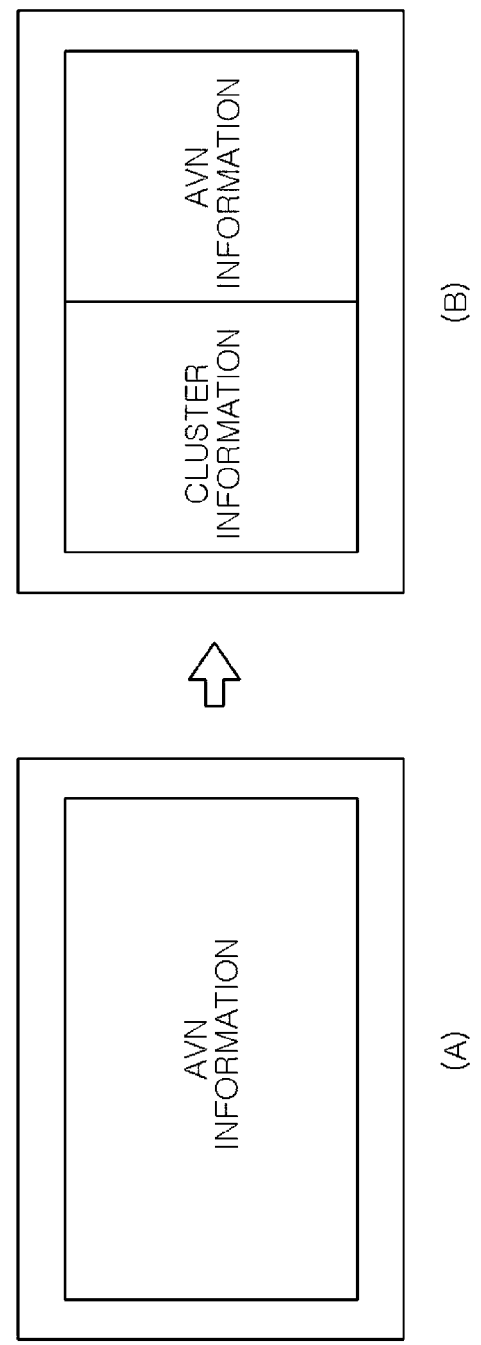

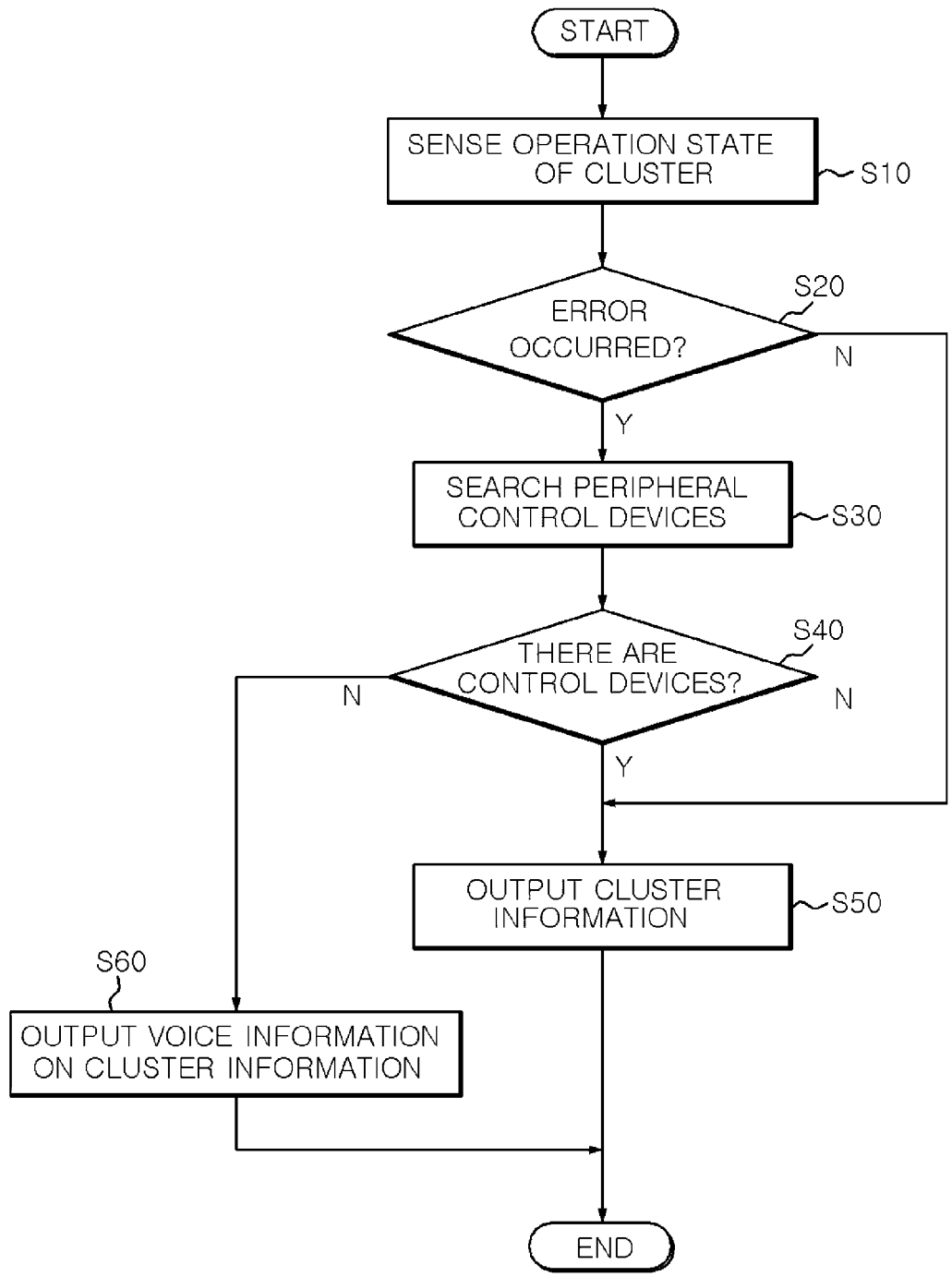

CLUSTER INFORMATION OUTPUT APPARATUS FOR VEHICLE AND CONTROL METHOD THEREOF

CROSS-REFERENCES TO RELATED APPLICATIONS

The present application claims priority to Korean application number 10-2014-0136672, filed on Oct. 10, 2014, which is incorporated by reference in its entirety.

BACKGROUND

The present disclosure relates to a cluster information output apparatus and a control method thereof, and more particularly, to a cluster information output apparatus for a vehicle, which determines the states and priorities of peripheral control devices and outputs essential information for operation such that the essential information can be displayed through a display of a peripheral control device when an error occurs on a front LCD panel of a cluster, and a control method thereof.

A cluster of a vehicle is a device which enables a driver to check the state or condition of the vehicle. The cluster displays a current speed of the vehicle, an engine RPM, a fuel state, a battery charge state, and operation states of various measuring instruments and devices, such that the driver can recognize the operation state of the vehicle.

Such a cluster may be divided into an analog cluster and a digital cluster.

The analog cluster displays data which are directly sensed by various electronic units or devices through indicators or display lamps, and the digital cluster controls data sensed by various devices or equipments through a control unit, and collectively displays the data through a display unit.

Recently, an interface designed by a user in person has been mounted on the digital cluster such that the user can receive gauge information according to the user's taste. Furthermore, the digital cluster may select and display only information needed by the user, thereby improving the function of the cluster and increasing the user's convenience.

The related technology is disclosed in Korean Patent Laid-open Publication No. 2012-0102463 published on Sep. 18, 2012 and titled "Method and system for editing and installing user interface of digital cluster for vehicle".

SUMMARY

Embodiments of the present invention are directed to a cluster information output apparatus for a vehicle, which determines the states and priorities of peripheral control devices and outputs essential information for operation such that the essential information can be displayed through a display of a peripheral control device when an error occurs on a front LCD panel of a cluster, and a control method thereof.

In one embodiment, a cluster information output apparatus for a vehicle may include: a plurality of peripheral control devices having a function of displaying cluster information; a storage unit configured to store the cluster information and priorities for the plurality of peripheral control devices; and a control unit configured to determine operation states for the plurality of peripheral control devices when an error occurs in an operation state sensed from a cluster, and output the cluster information.

The cluster information may include essential information for driving, which is defined for a vehicle state.

The control unit may output the cluster information to one or more of the plurality of peripheral control devices.

The control unit may determine operation states for the plurality of peripheral control devices according to the priorities, and output the cluster information.

The storage unit may further store voice information on the cluster information, and the cluster information output apparatus may further include a speaker configured to output the voice information on the cluster information, when the control unit checks the operation states for the plurality of peripheral control devices and determines that there are no peripheral control devices capable of cluster information.

Each of the peripheral control devices may output an operation state according to an operation state request of the control unit, and display the cluster information on a screen of a display when the cluster information is outputted from the control unit.

The peripheral control device may be connected to the control unit through internal communication of the vehicle.

The internal communication of the vehicle may include one or more of CAN (Controller Area Network), LIN (Local Interconnect Network), FlexRay, and MOST (Media Oriented Systems Transport).

In another embodiment, a control method of a cluster information output apparatus for a vehicle may include: sensing, by a control unit, an operation state of a cluster and determining whether an error occurred; when it is determined that an error occurred in the operation state of the cluster, searching, by the control unit, for a peripheral control device for outputting cluster information; and when there is a peripheral control device capable of outputting cluster information, outputting, by the control unit, the cluster information to the peripheral control device.

The control method may further include outputting, by the control unit, voice information on the cluster information when there is no peripheral control device capable of outputting cluster information.

The cluster information may include essential information for driving, which is defined for a vehicle state.

The outputting of the cluster information may include outputting the cluster information according to the priority of the peripheral control device, when there is the peripheral control device capable of outputting cluster information.

The outputting of the cluster information may include outputting the cluster information to one or more peripheral control devices capable of outputting cluster information, when there are one or more peripheral control devices capable of outputting cluster information.

BRIEF DESCRIPTION OF THE DRAWINGS

FIG. 3 is a diagram illustrating the change of an output state of an ANV (Audio Video Navigation) device in the cluster information output apparatus for a vehicle in accordance with the embodiment of the present invention.

FIG. 4 is a flowchart for describing a control method of a cluster information output apparatus for a vehicle in accordance with an embodiment of the present invention.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

In a cluster of the vehicle which implemented through the front LCD panel, essential information for driving cannot be outputted in case where an error occurs in the cluster such that the front LCD panel is not operated. Then, safe operation cannot be performed.

Figure 1:
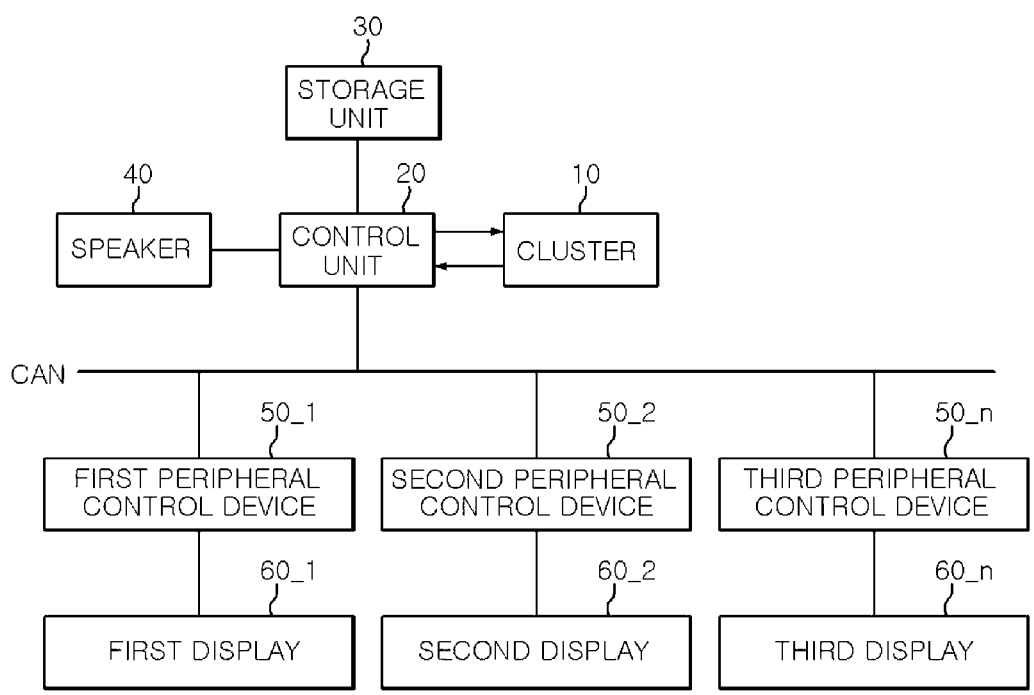
FIG. 1 is a block diagram illustrating a cluster information output apparatus for a vehicle in accordance with an embodiment of the present invention is mounted.
Figure 2:
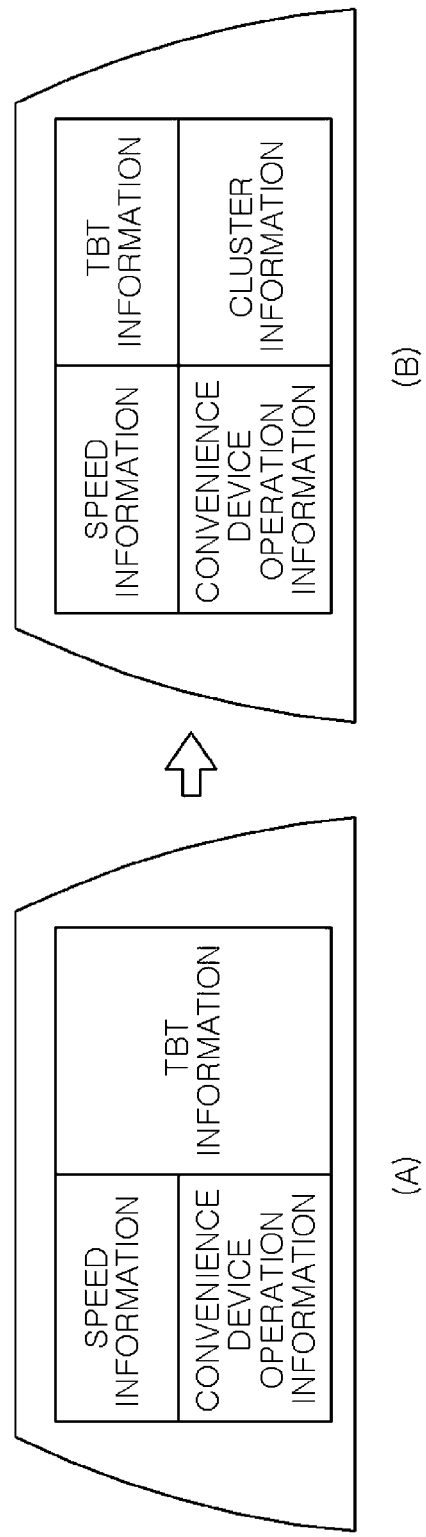
FIG. 2 is a diagram illustrating the change of an output state of an HUD (Head Up Display) in the cluster information output apparatus for a vehicle in accordance with the embodiment of the present invention.

FIG. 1 is a block diagram illustrating a cluster information output apparatus for a vehicle in accordance with an embodiment of the present invention is mounted. FIG. 2 is a diagram illustrating the change of an output state of an HUD (Head Up Display) in the cluster information output apparatus for a vehicle in accordance with the embodiment of the present invention. FIG. 3 is a diagram illustrating the change of an output state of an ANV (Audio Video Navigation) device in the cluster information output apparatus for a vehicle in accordance with the embodiment of the present invention.

As illustrated in FIG. 1, the cluster information output apparatus for a vehicle in accordance with the embodiment of the present invention may include a plurality of peripheral control devices 50_1 to 50_n, a storage unit 30, a control unit 20, and a speaker 40.

In the embodiment of the present invention, a cluster 10 of the vehicle may display various pieces of cluster information in a digital manner through a front LCD panel. The cluster information may include various vehicle states such as speed, engine RPM, traveling distance, safety belt state, door open/close state, fuel state, tire pressure state, engine overheat state, ABS state, airbag state, parking brake operation state, oil amount, and oil pressure, battery charge state.

At this time, essential information for safety may be defined and set for items which may have an influence on safe driving, among the vehicle states.

For example, the essential information for safety may be defined as basic regulations including fuel state, tire pressure state, engine overheat state, safety belt state, and door open/close state.

The peripheral control device 50 may indicate a driver convenience system or driver assistance system with a display 60, and include an HUD (Head UP Display), an AVN (Audio Video Navigation) device and the like. When a smart device is paired with the AVN system through near field communication, the peripheral control device 50 may include the smart device.

The peripheral control device 50 may be connected to the control unit 20 through internal communication of the vehicle, and have a function of outputting an operation state according to an operation state request from the control unit 20, and displaying cluster information on the screen of the display 60 when the cluster information is outputted from the control unit 20.

When displaying the cluster information on the screen of the display 60, the peripheral control device 50 may divide the screen of the display 60, and reduce and display the information of the peripheral control device 50 on a divided screen such that the cluster information can be displayed on another divided screen. Alternatively, the information of the peripheral control device 50 may be displayed so as to be scrolled or circulated, or selectively displayed.

In the present embodiment, the screen may be divided to display information. However, the method for displaying the cluster information and the information of the peripheral control device 50 may be designed in various manners.

At this time, the internal communication of the vehicle may include one or more of CAN (Controller Area Network), LIN (Local Interconnect Network), FlexRay, and MOST (Media Oriented Systems Transport).

The storage unit 30 may store cluster information and priority information on the peripheral control devices 50. Furthermore, the storage unit 30 may store voice information for the cluster information.

When an error occurs in an operation state sensed from the cluster 10, the control unit 20 may determine operation states for the peripheral control devices 50, and output cluster information to peripheral control devices 50 capable of outputting the cluster information.

At this time, the operation state of the cluster may indicate an abnormal state of a driver for driving a backlight of the front LCD panel, and can be checked through a connection state of the front LCD panel. Furthermore, the operation state of the cluster can be checked through a response signal received from the cluster 10 after the control unit 20 outputs a control signal to the cluster 10.

Furthermore, when the control unit 20 determines the operation states of the first to n-th peripheral control devices 50_1 to 50_n connected through the internal communication of the vehicle and determines the first and second peripheral control devices 50_1 and 50_2 as the peripheral control devices 50 capable of outputting cluster information, the control unit 20 may output the cluster information to the first peripheral control device 50_1 in case where the first peripheral control device 50_1 has a higher priority between the first and second peripheral control devices 50_1 and 50_2.

On the other hand, the control unit 20 may output the cluster information to both of the first and second peripheral control devices 50_1 and 50_2 capable of outputting cluster information.

For example, when it is assumed that the first peripheral control device 50_1 is an HUD, the first peripheral control device 50_1 may display speed information, convenience device operation information, and TBT (Turn By Turn) information through the first display 60_1 at normal times, as illustrated in (a) of FIG. 2. However, when cluster information is outputted, the TBT information screen may be divided to display the cluster information as illustrated in (b) of FIG. 2.

Furthermore, when it is assumed that the second peripheral control device 50_2 is an AVN device, the second peripheral control device 50_2 may display AVN information through the second display 60_2 at normal times, as illustrated in (a) of FIG. 3. However, when cluster information is outputted, the AVN information screen may be divided to display the cluster information, as illustrated in (b) of FIG. 3.

However, when there are no peripheral control devices 50 capable of outputting cluster information according to the determination result for the operation states of the first to n-th peripheral control devices 50_1 to 50_n connected through the internal communication of the vehicle, the control unit 20 may read voice information stored in the storage unit 30 for the cluster information, and output the voice information through the speaker 40 such that a driver can recognize the essential information for safety.

In accordance with the embodiment of the present invention, when an error occurs on the front LCD panel of the cluster 10, the cluster information output apparatus may determine the states and priorities of the peripheral control devices 50 and output the essential information for safety through the displays 60 of the peripheral control devices 50. Then, the fail safe function of the cluster 10 may be performed to stably maintain the vehicle state, thereby contributing to safe driving.

FIG. 4 is a flowchart for describing a control method of a cluster information output apparatus for a vehicle in accordance with an embodiment of the present invention.

Referring to FIG. 4, the control method of the cluster information output apparatus for a vehicle in accordance with the embodiment of the present invention will be described as follows. First, the control unit 20 may sense the operation state of the cluster 10 at step S10.

The operation state of the cluster 10 may indicate an abnormal state of the driver for driving the backlight of the front LCD panel, and can be checked through the connection state of the front LCD panel. Furthermore, the operation state of the cluster 10 may be sensed through a response signal received from the cluster 10 after outputting a control signal to the cluster 10.

Then, the control unit 20 may determine whether an error occurred in the cluster 10, based on the sensed operation state of the cluster 10, at step S20.

When it is determined at step S20 that no error occurred in the cluster 10, the control unit 20 may normally output cluster information to the cluster 10 such that the cluster information is displayed through the cluster 10, at step S50.

However, when it is determined at step S20 that an error occurred in the cluster 10, the control unit 20 may search peripheral control devices 50 capable of outputting cluster information, at step S30.

The peripheral control device 50 may indicate a driver convenience system or driver assistance system with a display 60, and include an HUD, an AVN device and the like. When a smart device is paired with the AVN device through near field communication, the peripheral control device 50 may include the smart device.

At this time, the peripheral control device 50 may be connected to the control unit 20 through the internal communication of the vehicle, and have a function of outputting an operation state according to an operation state request from the control unit 20, and displaying cluster information on the screen of the display 60 when the cluster information is outputted from the control unit 20.

When displaying the cluster information on the screen of the display 60, the peripheral control device 50 may divide the screen of the display 60, and reduce and display the information of the peripheral control device 50 on a divided screen such that the cluster information can be displayed on another divided screen. Alternatively, the information of the peripheral control device 50 may be displayed so as to be scrolled or circulated, or selectively displayed.

In the present embodiment, the screen may be divided to display information. However, the method for displaying cluster information and information of the peripheral control device 50 may be designed in various manners.

At this time, the internal communication of the vehicle may include one or more of CAN, LIN, FlexRay, and MOST.

Thus, the control unit 20 may request operation states from the peripheral control devices 50 through the internal communication of the vehicle, and search peripheral control devices 50 capable of cluster information in which no errors occur.

The cluster information may include various vehicle states such as speed, engine RPM, traveling distance, safety belt state, door open/close state, fuel state, tire pressure state, engine overheat state, ABS state, airbag state, parking brake operation state, oil amount, oil pressure, and battery charge state.

Thus, the essential information for safety may be defined and set for items which may have an influence on safe driving, among the vehicle states.

For example, the essential information for safety may be defined by basic regulations including fuel state, tire pressure state, engine overheat state, safety belt state, and door open/close state.

The control unit 20 may determine whether there exist peripheral control devices 50 capable of cluster information, at step S40.

When it is determined at step S40 that there are peripheral control devices 50 capable of outputting cluster information, the control unit 20 may output cluster information to one or more of the peripheral control devices 50 such that the cluster information can be displayed through the display 60 of the corresponding peripheral control device 50, at step S60.

At this time, the control unit 20 may output the cluster information to a peripheral control device 50 having a high priority according to the priority information on the peripheral control devices.

Furthermore, the control unit 20 may output the cluster information to all peripheral control devices 50 capable of outputting the cluster information.

When the peripheral control devices 50 are searched at step S40, the control unit 20 may request an operation state from a peripheral control device 50 according to the priority, and output and display cluster information in case where the operation state is normal. That is, when an error occurred in a peripheral control device 50 according to the priority, the control unit 20 may determine the operation state of the peripheral control device 50 having the next priority, and output cluster information.

When it is determined at step S40 that there are no peripheral control devices 50 capable of outputting cluster information, the control unit 20 may read voice information stored in the storage unit 30 for the cluster information, and output the voice information through the speaker 40 such that a driver can recognize the essential information for safety, at step S60.

In accordance with the embodiment of the present invention, when an error occurs on the front LCD panel of the cluster 10, the cluster information output apparatus for a vehicle may determine the state and priory of a peripheral control device 50 and output the essential information for safety through the display 60 of the peripheral control device 50. Thus, the fail safe function of the cluster may be performed to stably maintain the vehicle state, thereby contributing to safe driving.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A cluster apparatus of a vehicle, comprising:
   a cluster display configured to display driving information that comprises at least one selected from the group consisting of a speed, an rpm, and a driving distance of the vehicle;
   at least one peripheral display configured to display at least part of the driving information when the cluster display becomes out of order; and
   a controller configured to control the cluster display and the at least one peripheral display such that the controller causes at least part of the driving information to be displayed on the at least one peripheral display when the cluster display becomes out of order and further such that the controller causes at least part of the driving information to be spoken with a speaker when the at least one peripheral display also becomes out of order.

2. The cluster apparatus of claim 1, wherein the at least one peripheral display comprises a first peripheral display and a second peripheral display, wherein the controller causes the driving information to be displayed by the first and second peripheral displays in a predetermined order such that the driving information is displayed on the first peripheral display if the first peripheral display is capable of displaying when the cluster display is out of order and further such that the driving information is displayed on the second peripheral display only when both the cluster display and the first peripheral display are out of order.

3. The cluster apparatus of claim 1, wherein the controller is configured to determine operative status of the at least one peripheral display.

4. The cluster apparatus of claim 1, wherein the at least one peripheral display is connected to the controller via internal communication of the vehicle.

5. The cluster apparatus of claim 4, wherein the internal communication of the vehicle comprises one or more of Controller Area Network (CAN), Local Interconnect Network (LIN), FlexRay, and Media Oriented Systems Transport (MOST).

6. A method of displaying driving information of a vehicle, comprising:
   monitoring operation of a cluster display that displays the driving information that is at least one selected from the group consisting of a speed, an rpm and a driving distance of the vehicle;
   subsequently causing at least part of the driving information to be displayed on at least one peripheral display when it is determined that the cluster display is not capable of displaying the driving information;
   subsequently monitoring operation of the at least one peripheral display that displays the at least part of the driving information; and
   subsequently causing at least part of the driving information to be spoken with a speaker when it is determined that the at least one peripheral display is not capable of displaying the at least part of the driving information while the cluster display is not capable of displaying the driving information.

7. The method of claim 6, wherein the at least one peripheral display comprises a first peripheral display and a second peripheral display, wherein the method further comprising causing at least part of the driving information to be displayed by the first and second peripheral displays in a predetermined order such that at least part of the driving information is displayed on the first peripheral display if the first peripheral display is capable of displaying when the cluster display is out of order and further such that at least part of the driving information is displayed on the second peripheral display only when both the cluster display and the first peripheral display are out of order.

* * * * *